United States Patent

[11] 3,574,967

[72] Inventor Thaddeus M. Splawinski
  Saskatoon, Canada
[21] Appl. No. 822,981
[22] Filed May 8, 1969
[45] Patented Apr. 13, 1971
[73] Assignee Snagaway Tackle Ltd.

[54] FISH BAIT RETRIEVER AND REEL ASSEMBLY
  7 Claims, 9 Drawing Figs.
[52] U.S. Cl. .................................................. 43/17.2
[51] Int. Cl. ............................................. A01k 97/00
[50] Field of Search ......................................... 43/17.2

[56] References Cited
UNITED STATES PATENTS
2,586,170 2/1952 Lawrenz ..................... 43/17.2
3,243,911 4/1966 Splawinski ................... 43/17.2
3,360,292 12/1967 Trammell ..................... 43/17.2

Primary Examiner—Warner H. Camp
Attorneys—Clarence A. O'Brien and Harvey B. Jacobson ABSTRACT: A fish bait retriever in the form of concentric loops hingedly interconnected with the outer loop having an entrance slot adjacent the hinge point for receiving a fishline and the inner loop having a flexible line attached thereto for enabling the retriever to be placed on a fishline and moved by gravity to engagement with a fish lure, hook assembly or the like and the line tensioned to retrieve the bait, lure, hook assembly or the like. The flexible line attached to the inner loop is connected to a belt attached reel that includes a manually rotatable spool having a pocket in the exterior face thereof for frictionally and detachably storing the retriever.

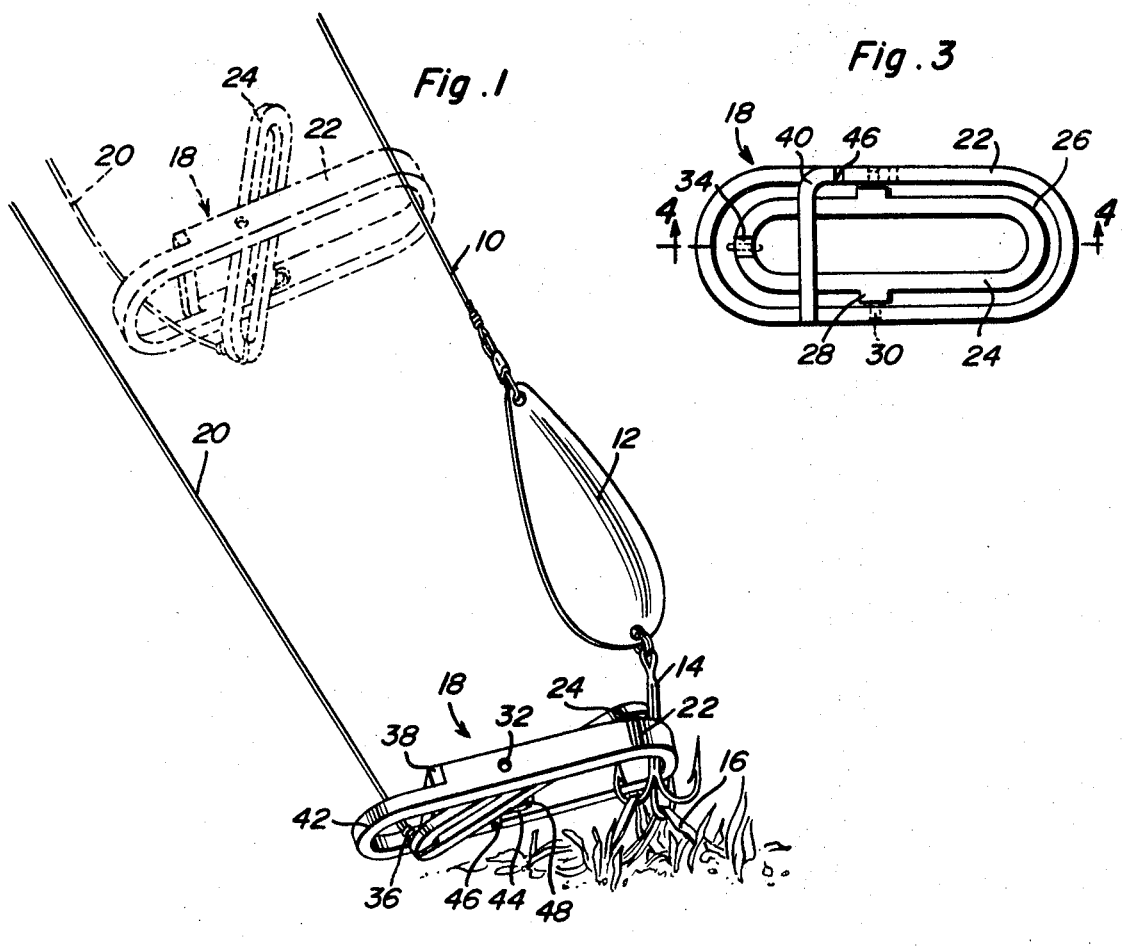

Patented April 13, 1971
3,574,967
2 Sheets-Sheet 2
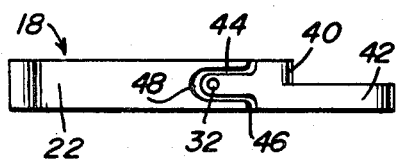
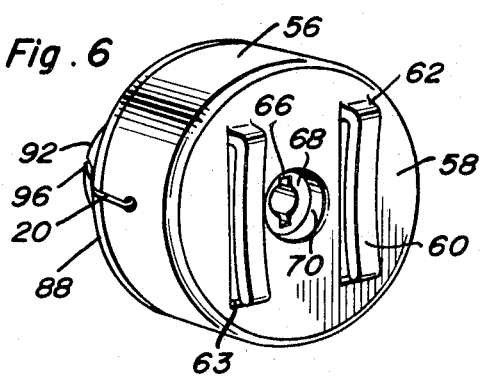
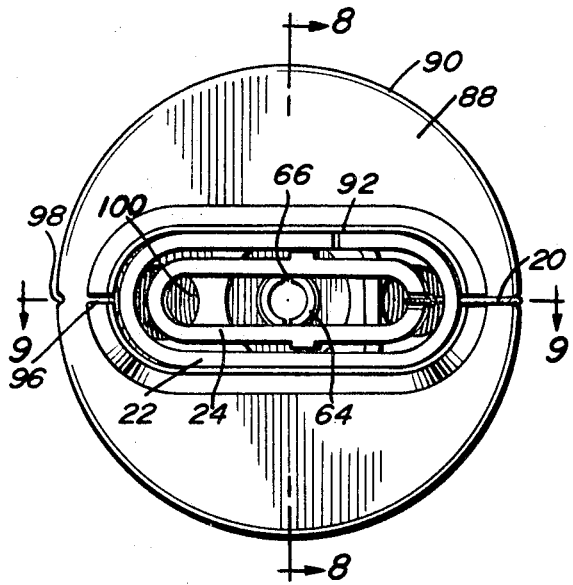
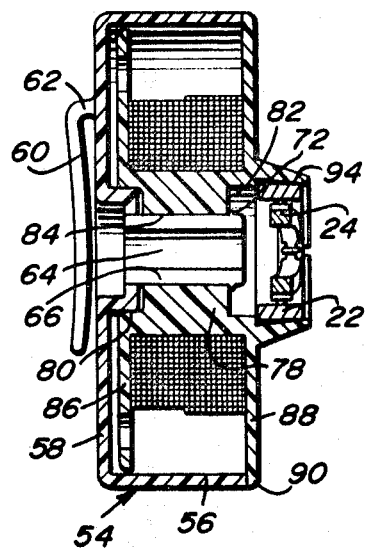
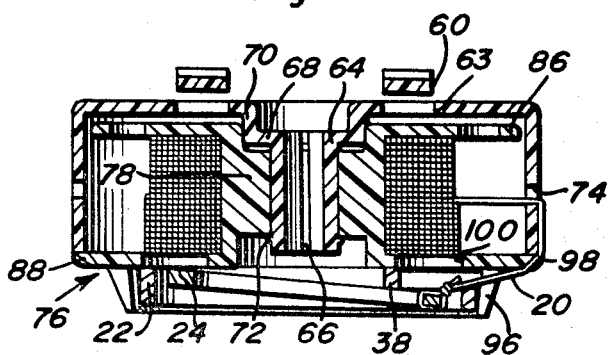
Thaddeus M. Splawinski
INVENTOR.
BY Clarence A. O'Brien
and Harvey B. Jacobson
Attorneys

3,574,967

FISH BAIT RETRIEVER AND REEL ASSEMBLY

The present invention generally relates to a fish bait retriever and reel assembly and includes improvements in the structure disclosed in copending application, Ser. No. 700,946, filed Jan. 26, 1968 for Fish Bait Retriever and Reel Assembly now Pat. No. 3,512,292, with the retriever disclosed in this application also including improvements over the retriever disclosed in prior U.S. Pat. No. 3,243,911, patented Apr. 5, 1966 for Fish Bait Retriever.

When fishing, it sometimes occurs that the fishhook or hook assembly will snag underwater obstructions such as sunken logs, limbs on trees, rocks, crevices, vegetation and the like. Due to the construction of the hook, tugging on the fishline usually serves merely to lodge the hook tighter in the obstruction. Excessive pull on the line in an effort to free the hook and lure will result in breakage of the fishline and subsequent loss of the hook, lure, leader and associated structural components of the fish tackle. The loss of the tackle represents a substantial economic loss and also, the expenditure of considerable time is necessary to replace the lost components thus materially reducing the pleasure and sport derived from fishing.

Various devices have previously been developed for use in endeavoring to dislodge a snagged hook and such devices have met with some degree of success. In the aforementioned patent and copending application, a retriever has been provided which is engaged onto the fishing line and then slid downwardly along the line to engage with the lure or hook after which a pull exerted on the retriever independent of any pull exerted on the fishline will dislodge the hook. The entry slot is in the upper end of an outer loop of concentric loops defining the retriever and it has been found that in some instances, the fishing line will get caught in the upper entry slot when the retriever is manipulated down the fishing line. When this happens, the fishing line will be cut if the fisherman exerts a pull on the inner loop in an effort to disengage the outer loop of the retriever from the fishing line. If the fishing line enters the entry slot when the retriever may merely fall off of the fishing line thus requiring that the entire procedure be subsequently initiated.

Accordingly, an object of the present invention is to provide a retriever having concentric loops hingedly interconnected with the outer loop having an entry slot for the fishing line which permits the fishing line to enter the upper end portion of the outer loop from below the axis of pivotal connection between the outer loop and the inner loop thus making it impossible for the fishing line to become caught in the entry slot and eliminating any possibility of the fishing line being cut off when this occurs and rendering it impossible for the retriever to fall off the fishing line during descent along the fishing line.

The aforementioned copending application discloses a reel for the flexible line or string attached to the retriever which includes a projecting post which forms a bearing for the reel spool and also supportingly engages a crossmember on the retriever. It is another object of the present invention to provide a reel assembly having a hollow housing attached to the belt of a fisherman with the housing receiving a rotatable reel spool with the outer face of the reel spool having a projecting wall of oval-shaped configuration for telescopically and frictionally receiving the outer loop or ring of the retriever for frictionally retaining the retriever in a stored position.

A further important object of the present invention is to provide a reel assembly which may be employed as a general purpose reel with the outer face of the spool having a suitable handle, finger-type recess or other means in the reel face to enable rotation of the reel when used for general utility.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the retriever associated with a hook assembly and illustrating the manner in which the hook assembly is dislodged.

Fig. 2 is a perspective view of the reel assembly illustrating the retriever in stored position in the recess formed on the outer face of the reel spool.

FIG. 3 is a top plan view of the retriever.

FIG 4 is a longitudinal, sectional view of the retriever taken substantially upon a plane passing along section line 4—4 of FIG. 3 illustrating the specific relationship of the components of the retriever.

FIG. 5 is a side elevational view of the retriever illustrating the association of the entrance slot for the fishline to the pivot axis for the inner loop or ring.

FIG. 6 is a perspective view of the reel illustrating the housing structure and the belt engaging clips thereon.

FIG. 7 is a front elevational view of the reel assembly illustrating the retriever in stored position.

FIG. 8 is a vertical sectional view taken substantially upon a plane passing along section line 8—8 of FIG. 7 illustrating the structural details of the reel assembly and the association of the walls of the recess for frictionally engaging the periphery of the retriever.

FIG. 9 is a sectional view taken substantially upon a plane passing along section line 9—9 of FIG. 7 illustrating further structural details of the reel assembly and its association with the retriever.

Referring now specifically to the drawings, FIG. 1 illustrates a fishing line or leader 10 having a lure 12 at the lower end thereof and a hook or hook assembly 14 associated therewith subject to becoming snagged onto an underwater obstruction such as vegetation 16, logs, rocks, crevices and the like. The construction of the components of the fishing tackle are conventional and form no particular part of the present invention except in their association with the retriever which is generally designated by the reference numeral 18 and is provided with a flexible string or line 20 of any suitable character with the strength characteristics of the line 20 being substantially greater than the strength characteristics of the fishing line or leader 10.

The retriever 18 includes an oval-shaped outer loop or ring 22 and a concentric inner loop or ring 24. The inner loop or ring 24 has an outside dimension slightly less than the inside dimension of the outer loop 22 to define a peripheral space 26 between the inner and outer loops. The inner loop 24 has a pair of outwardly extending bosses or projections 28 on the opposed surfaces thereof adjacent the longitudinal center of each side of the inner loop 24 but slightly adjacent one end of the loop as compared with the other. Each boss serves as a reinforcement for an outwardly projecting hinge pin 30 which is rotatably received in an opening 32 in the outer loop 22. The bosses 28, hinge pins 30 and apertures 32 are all located slightly off center toward one end of the retriever.

The short end of the inner loop 24 is provided with a notch or recess 34 extending across upper and lower surfaces thereof to define a recess for receiving the looped and knotted end of the line 20 as designated by the numeral 36. This locates the line 20 and prevents it from sliding around the periphery of the inner loop 24 thus retaining the line 20 attached to the short end of the inner loop 24.

The short end portion of the outer loop 22 is provided with a transverse bar 38 extending across the outer loop in spaced relation to the end thereof for providing a limit for the pivotal movement of the inner loop 24 in one direction thereof with the bar 38 being disposed intermediate the pivot axis and the short ends of the inner and outer loops. The space between the bar 38 and the short end of the outer loop 22 provides an area for passage of the line 20 as illustrated in FIGS. 1 and 4. The transverse bar 38 is formed by longitudinally slitting a portion of the loop 22 and separating one end portion of the upper portion of the outer loop defining the slit and bending the bar as at 40 across the loop 22 and then cutting off the bar so that the terminal end thereof is flush with the outer surface of the loop 22 as illustrated in FIG. 3 so that the outer loop 22 is of one-piece construction with the shorter end portion designated by the numeral 42 being substantially one-half of the depth of the remainder of the outer loop with the transverse bar 38 having an upper surface flush with the top surface of the loop 22 as illustrated in FIG. 4.

One side portion of the outer loop 22 is provided with a substantially U-shaped slot 44 formed therein which has the end portions thereof outwardly flared as at 46 and communicating with the top and bottom edges of the outer loop 22, and located between the hinge axis or apertures 32 and the short end 42 of the outer loop. The bight portion or web portion of the U-shaped slot 44 as designated by the numeral 48 is oriented on the opposite side of the hinge axis or apertures 32 from the entrance ends 46 thus requiring that the fishing line be threaded through the entrances 46 and then through the remainder of the slot 44 in order to thread the fishing line into the outer loop 22.

When engaging the retriever 18 on the fishing line 10, the bar 38 is placed upwardly and the fishing line is threaded through the entrance ends of the slot 44 and into the area defined by the longer end portion of the outer loop 22 as illustrated in FIG. 1. The retriever then is permitted to slide down the fishing line 10 due to gravity and the outer loop progresses over the lure 12 and engages the shank of the hook assembly 14. Then, the flexible line 20 is attached to the inner loop 24 may be tensioned and the longer end of the inner loop 24 will come into contact with the hook shank or at least prevent the retriever from sliding upwardly along the hook shank and lure so that substantial tension may be exerted on the line 20 for dislodging the hook from its snagged condition. The line 20 has sufficient strength to dislodge the hook even if it is necessary to spring the hook which could possibly require replacement of the hook but would retrieve the remainder of the tackle.

Movement of the retriever down the fishing line is facilitated by retaining the fishing line in a substantially taut condition and in some instances it may be desirable to move the fishing line or jerk on it slightly to facilitate downward movement of the retriever. The retriever may be engaged with various components of the fishing tackle such as the hook, lure, swivel assemblies for the leader and the like so that the retriever may be effectively employed for unsnagging the hook regardless of the conditions which may be encountered. The retriever is constructed of a metal material not subject to corrosion and of sufficient weight to cause it to sink by gravity and preferably, the retriever is brightly covered to enable observation thereof. For example, when the lure is colored a silver color, it frequently occurs that the fisherman can observe the position of the retriever in relation to the fish lure or hook assembly especially if the water is relatively clear thus enabling more efficient manipulation and operation of the retriever.

The flexible line 20 attached to the retriever is connected with a reel assembly generally designated by the numeral 50 which is mounted on the belt 52 of a fisherman to facilitate storage of the line 20 and also storage of the retriever 18 in an out-of-the-way stored position.

The reel assembly 50 includes a substantially cylindrical casing or housing 54 including a peripheral cylindrical wall 56 and a substantially flat inner wall 58 having a pair of belt clips 60 integral therewith with the belt clips overlying slotlike openings 62 in the wall 58 and being slightly curved from their upper end where they are attached to the wall as at 62 for slipping downwardly over the belt 52 and frictionally gripping the belt 52 where detachably but yet securely mounting the reel assembly on the belt. Centrally of the circular plate 58, there is provided a bearing post 64 which is longitudinally slit at 66. The inner end of the post 64 is integral with an inwardly offset baseplate 68 that is connected with the wall 58 by an offset portion 70. The peripheral wall 56, the circular wall 58, the offset portion 70, the baseplate 68 and the post 64 are all of one-piece construction preferably of plastic material with the longitudinal slit extending continuous throughout the length of the post at opposed surfaces thereof with the slit also extending through the baseplate 68 as illustrated in FIG. 6 to enable the external dimensions of the post 64 to slightly decrease when lateral inward pressure is exerted on the post.

Adjacent the free end of the post 64, there is provided a peripheral rib 72 thereon for a purpose described hereinafter and at diametrically opposed points on the wall 56, there are provided apertures 74 also for a purpose described hereinafter with the apertures 74 being disposed substantially perpendicular to the belt clips 60.

Rotatably mounted on the housing 54 is a reel spool 76 which includes a central hub 78 of cylindrical configuration with the hub 78 including a recess 80 in the inner end thereof and a recess 82 in the outer end thereof and a bore or passageway 84 extending therethrough for rotatably movement on the post 64. The recess 80 receives the baseplate 68 and a portion of the offset 70 to further stabilize the rotational movement of the reel spool. The flexibility of the plastic material from which the post 64 is mounted enables the hub 78 to be assembled on the post by forcing the spool inwardly with the periphery of the bore 84 camming the segments of the peripheral rib 72 inwardly with the rib 72 then springing out and holding the hub 78 in position. The hub may be removed by forcing it outwardly in exactly the same manner thereby detachably mounting the reel on the post 64.

The inner edge of the hub is provided with a circular plate 86 which telescopes into the peripheral wall 56 in closely spaced relation thereto and the outer end of the hub 78 is provided with an outer plate or face 88 which is slightly larger than the plate 86 and which forms a closure for the peripheral wall 56. The edge of the outer plate or face 88 is slightly beveled and rounded as at 90 to form a smooth closure for the reel casing 54 to retain the line 20 thereon with the line 20 being wound on the spool 76 and exiting through one of the apertures 74.

Projecting outwardly from the central portion of the outer plate 88 is an oval-shaped flange or wall 92 which has a shape and configuration to telescopically receive the outer loop 22 of the retriever 18. As illustrated in FIG. 8, the outer surface of the flange 92 slopes toward the periphery of the plate 88 and the inner surface thereof also slopes in a similar manner but to a lesser angle to frictionally grip the periphery of the retriever with the frictional gripping point being designated by numeral 94. Thus, by placing the retriever within the interior periphery of the flange 92 and forcing it inwardly, the retriever will be frictionally gripped and retained in stored position completely encompassed within the recess defined by the flange 92. Each end of the flange 92 is provided with a notch or slot 96 which provides for passage of the line 20 and also provides for flexibility of the elongated portions of the flange 92. When the retriever is assembled in the recess, the bar 38 is placed downwardly and the string extends out from under the narrow portion 42 of the outer loop, through the notch 96 and through a notch 98 formed in the periphery of the plate or face 88. The reel spool 76 may be rotated by gripping the inclined outer peripheral surfaces of the flange 92 when the retriever is in position thus enabling the retriever to be set in the desired position. FIG. 2 illustrates the stored condition of the reel assembly and retriever during normal fishing operations. In the event the hook becomes snagged, it is only necessary for the fisherman to grasp the line 20 and pull outwardly on it thus dislodging the retriever by exerting lateral force on the end of the retriever having the line attached thereto. Then by pulling on the retriever or the line 20, the retriever may be brought into position for threading onto the fishline 10. Then, by pulling outwardly on the line 20, the line 20 may be unreeled thus permitting the retriever 18 to proceed down the fishing line. All of this action is permitted with one hand while the other hand retains possession of the fishing rod, reel or the like. After the retriever has unsnagged the fish line, both the fish line and the retriever line 20 may be reeled in with the reel spool 76 being rotated by either engaging the flange 92 or inserting the finger in one of the fingerholes 100 in the outer plate 88 which communicates with the bottom of the recess defined by the flanges 92 thus facilitating rotation of the reel for winding the string or line 20 thereon. When the fishline and the retriever line both have been reeled in by sequential actuation of the reel spool 76 and the reel on the fishing rod, the retriever may be unthreaded from the fishline by engaging the fishline with the entrances to the U-shaped slot 44 and moving the fishline therethrough after which the remainder of the line 20 may be wound onto the reel until the retriever closely approaches the wall 56 at which time the retriever may then be grasped and forced into the recess defined by the flanges 92.

Reel spool 76 is also constructed one one piece of material, preferably plastic and all of the edges of the reel assembly are rounded and smooth. The inner plate 86 of the reel spool may be provided with holes therein to save material and also to enable the quantity of string 20 wound thereon to be determined. Also, by detaching the line 20 from the retriever, the line and reel assembly may be employed for other purposes associated with fishing, camping or the like and may be employed for any general utility for which a line reel is desired. For example, the device may be used when flying a kite or for other purposes. When so used, the retriever may be removed and the fingerholes 100 used to rotate the reel or the reel spool may be replaced with a similar reel spool that has a smooth exterior surface with any suitable handle, finger recess or other means provided for rotating the reel spool. This enables the housing and belt clip assembly to be left in position and it only being necessary to remove from reel spool and replace it with another so that different kinds of line may be provided for the different purposes for which the reel will be used.

While the clips 60 have been disclosed as engaging a belt, it will be clear that the clips may engage over the waistband of any garment or the upper edge of any portion of a garment on the thin upper edge of any support. Also, the holes in the plate or plates of reel facilitate drying of wet string wound thereon.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A retriever for fishing tackle that has become snagged comprising concentric inner and outer ringlike members, means pivotally interconnecting said members for relative pivotal movement therebetween, means extending across the outer member for limiting the pivotal movement of the inner member in relation thereto, a flexible line attached to the inner member, said outer member including an entrance slot interrupting the continuity of the outer member to enable the outer member to be threaded onto the fishing line of the snagged fishing tackle, said entrance slot being disposed adjacent the pivot axis between the inner and outer members with the line attached to the inner member being remote from the slot and the area of the outer member engaging the fishing line after being threaded thereon being remote from the entrance slot to substantially eliminate accidental disengagement of the retriever from the fishing line after threading thereon and engagement of the fishing line in the entrance slot after engagement therewith which could result in cutting of the fishing line when tension is exerted on the flexible line attached to the inner member, said outer and inner ringlike members being of oval-shaped configuration, aid means pivotally interconnecting said members being substantially at the central portion of the length of the oval-shaped members and including projecting pins rigid with the inner member and rotatably journaled in apertures in the outer member, one end of the inner member having a recess therein with the flexible line attached to the inner ring member in the recess to retain the line properly associated with the inner member.

2. The structure as defined in claim 1 wherein said means extending across the outer member includes a transverse bar formed integrally from a portion of the outer member with one end of the bar being integral with the outer member and the other end being rigidly secured thereto, said entrance slot being substantially U-shaped in configuration with the two ends thereof being located on the side of the hinge axis adjacent the point of connection between the flexible line and the inner member and the web portion of the entrance slot being on the opposite side of the hinge axis so that the weight of the inner and outer members and the line attached to the inner member retains the fishing line in the portion of the outer ring member remote from the hinge axis and entrance slot.

3. The structure as defined in claim 2 together with a reel assembly for the flexible line attached to the inner member, said reel assembly including a housing having an open end, means for supporting the housing, a spool mounted in the housing, said housing including an aperture therein receiving the flexible line for reeling and unreeling of the line on the spool, and means mounting the spool rotatably and detachably in the housing with the spool forming a closure for the open end thereof, said means mounting the spool in the housing including a post rigid with the housing, said spool including a hub journaled on said post, said post being longitudinally split and provided with a peripheral rib at the free end thereof and constructed of resilient material to enable the exterior periphery of the post to reduce to enable the hub to be forced thereon after which the peripheral rib will retain the hub rotatably and detachably on the post, said spool including an outwardly extending flange thereon defining a recess for telescopically receiving the retriever, said flange including an interior wall surface sloping inwardly toward the outer edge thereof for frictionally gripping the retriever when placed therein, the flange defining the recess being provided with a notch therein receiving the line secured to the inner member with the line serving as means for removing the retriever from the recess, said flange on the reel spool being oval-shaped to conform with the configuration of the retriever with the notch in the flange being at the end of the oval-shaped flange.

4. A retriever for fishing tackle that has become snagged comprising concentric inner and outer ringlike members, means pivotally interconnecting said members for relative pivotal movement therebetween, means extending across the outer member for limiting the pivotal movement of the inner member in relation thereto, a flexible line attached to the inner member for urging it toward the means extending across the outer member, said outer member including an entrance slot interrupting the continuity of the outer member to enable the outer member to be threaded onto the fishing line of the snagged fishing tackle, said entrance slot being disposed adjacent the pivot axis between the inner and outer members with the line attached to the inner member being remote from the slot and the area of the outer member engaging the fishing line after being threaded thereon being remote from the entrance slot to substantially eliminate accidental disengagement of the retriever from the fishing line after threading thereon and engagement of the fishing line in the entrance slot after engagement therewith which could result in cutting of the fishing line when tension is exerted on the flexible line attached to the inner member, and a reel assembly for the flexible line attached to the inner member, said reel assembly including a housing having an open end, means for supporting the housing, a spool mounted in the housing, said housing including an aperture therein receiving the flexible line for reeling and unreeling of the line on the spool, and means mounting the spool rotatably and detachably in the housing with the spool forming a closure for the open end thereof.

5. The structure as defined in claim 4 wherein said means mounting the spool in the housing includes a post rigid with the housing, said spool including a hub journaled on said post, said post being longitudinally split and provided with a peripheral rib at the free end thereof and constructed of resilient material to enable the exterior periphery of the post to reduce to enable the hub to be forced thereon after which the peripheral rib will retain the hub rotatably and detachably on the post.

6. The structure as defined in claim 5 wherein the spool includes an outwardly extending flange thereon defining a recess for telescopically receiving the retriever, said flange including an interior wall surface sloping inwardly toward the outer edge thereof for frictionally gripping the retriever when placed therein.

7. The structure as defined in claim 6 in which the flange defining the recess is provided with a notch the rein receiving the line secured to the inner member with the line serving as means for removing the retriever from the recess.